United States Patent
Lee et al.

(10) Patent No.: US 6,350,054 B1
(45) Date of Patent: Feb. 26, 2002

(54) AGITATOR FOR A HORIZONTAL POLYMERIZATION REACTOR HAVING CONTIGUOUS PADDLE STATIONS WITH PADDLES AND SUB-STATIONS WITH SUB-STATION PADDLES

(75) Inventors: James Hanawalt Lee, Naperville; Chi-Hung Lin, Wheaton; Barry F. Wood, Naperville, all of IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/206,625

(22) Filed: Dec. 7, 1998

Related U.S. Application Data (60) Provisional application No. 60/067,867, filed on Dec. 8, 1997.

(51) Int. Cl.[7] .................................................. B01F 7/04
(52) U.S. Cl. .......................... 366/325.92; 366/329.1; 422/135; 422/226
(58) Field of Search .............................. 366/64, 325.92, 366/327.1, 327.4, 329.1, 330.1, 327.3, 329.2, 329.3, 325.93, 66, 96–99; 422/135, 137, 224, 225, 226

(56) References Cited

U.S. PATENT DOCUMENTS

| | | | |
|---|---|---|---|
| 924,744 A | * | 6/1909 | Blystone |
| 970,419 A | * | 9/1910 | Cargill |
| 2,628,007 A | | 2/1953 | Handwerk |
| 3,145,017 A | * | 8/1964 | Thomas |
| 3,639,377 A | * | 2/1972 | Trieschmann et al. |
| 3,652,527 A | * | 3/1972 | Trieschmann et al. |
| 3,944,534 A | * | 3/1976 | Sennari et al. |
| 3,957,448 A | * | 5/1976 | Shepard |
| 3,965,083 A | | 6/1976 | Jezl et al. |
| 3,970,611 A | * | 7/1976 | Jezl et al. |

(List continued on next page.)

FOREIGN PATENT DOCUMENTS

| | | |
|---|---|---|
| DE | 388380 | 1/1924 |
| GB | 1365597 | 9/1974 |

Primary Examiner—Charles E. Cooley
(74) Attorney, Agent, or Firm—Patrick J. Kim; Wallace L. Oliver; Scott P. McDonald (57) ABSTRACT

Improved apparatus for mechanically stirring a quench-cooled subfluidized particulate bed of polymerized monomer lowers lumping of polymer particles by using substantially contiguous paddle stations disposed along the drive shaft within the reactor in combination with a plurality of sub-stations in at least one paddle station class, each sub-station having a width along the shaft of no more than 50 percent of the total width of the paddle station, and sub-station paddles attached to the shaft at each sub-station so as to sweep through the particulate bed. In some embodiments, a first class of stations is, advantageously, disposed within the reactor along a portion of the drive shaft in repeating groups of at least two stations and a second class of stations with sub-stations is disposed within the reactor along another portion of the drive shaft, preferably in repeating groups of at least one more than the number of stations in the repeating group of the first class, to further reduce lumping of polymer particles.

20 Claims, 7 Drawing Sheets

U.S. PATENT DOCUMENTS

| | | | | |
|---|---|---|---|---|
| 3,971,768 A | * | 7/1976 | Peters et al. |
| 3,971,786 A | * | 7/1976 | Durant et al. |
| 4,003,712 A | * | 1/1977 | Miller |
| 4,101,289 A | * | 7/1978 | Jezl et al. |
| 4,107,793 A | * | 8/1978 | Wallace |
| 4,128,052 A | * | 12/1978 | Mueller et al. |
| 4,129,701 A | * | 12/1978 | Jezl et al. |
| 4,310,124 A | * | 1/1982 | Schwing et al. |
| 4,326,048 A | * | 4/1982 | Stevens et al. |
| 4,337,069 A | * | 6/1982 | German, Jr. et al. |
| 4,344,692 A | * | 8/1982 | Oda |
| 4,460,278 A | * | 7/1984 | Matsubara et al. |
| 4,535,134 A | * | 8/1985 | Lorenzo et al. |
| 4,569,809 A | * | 2/1986 | Baggett |
| 4,590,044 A | * | 5/1986 | Mos et al. |
| 4,610,574 A | * | 9/1986 | Peters |
| 4,627,735 A | * | 12/1986 | Rose et al. |
| 4,640,963 A | * | 2/1987 | Krieder et al. |
| 4,708,787 A | * | 11/1987 | Peters et al. |
| 4,801,433 A | * | 1/1989 | Yamanaka et al. |
| 4,829,038 A | * | 5/1989 | Hoppin et al. |
| 4,866,022 A | * | 9/1989 | Arzoumanidis et al. |
| 4,883,847 A | * | 11/1989 | Leung et al. |
| 4,921,919 A | * | 5/1990 | Lin et al. |
| 5,145,255 A | * | 9/1992 | Shimada et al. | 422/135 |
| 5,209,607 A | * | 5/1993 | Wei et al. |
| 5,504,166 A | * | 4/1996 | Buchelli et al. |
| 5,538,747 A | * | 7/1996 | Mueller |
| 5,738,439 A | * | 4/1998 | Flower | 366/325.92 |

* cited by examiner

AGITATOR FOR A HORIZONTAL POLYMERIZATION REACTOR HAVING CONTIGUOUS PADDLE STATIONS WITH PADDLES AND SUB-STATIONS WITH SUB-STATION PADDLES

CROSS-REFERENCE TO RELATED APPLICATIONS

This application claims benefit of U.S. Provisional Application No. 60/067,867 filed Dec. 8, 1997, which application specifically is incorporated herein by reference.

TECHNICAL FIELD

The present invention relates to apparatus for mechanically stirring a quench-cooled subfluidized particulate bed of polymerized monomer during continuous vapor phase polymerization in horizontally disposed cylindrical polymerization reactors. More particularly, the invention is an improved apparatus for stirring polymer particles in reactive gas-filled polymerization reactors incorporating contiguous paddle stations on a coaxial drive shaft within the reactor with a plurality of sub-stations having lengths along the shaft.

BACKGROUND OF THE INVENTION

U.S. Pat. No. 3,639,377 (Trieschmann et al.) describes polymerization of propylene which is carried out in the gas phase. In order that heat of polymerization should be effectively removed, excess monomeric propylene is introduced in liquid or partly liquefied form into the bottom of a vertically disposed cylindrical reaction zone. During polymerization, the fraction of unpolymerized propylene evaporates while absorbing the heat of polymerization. Evaporated propylene is removed from the reaction zone and condensed again outside the reaction zone. While stating that removal of heat according this system of internal cooling also causes intense mixing of the solid polymer powder with the gas phase, Trieschmann et al. state that it is particularly advantageous to use a reactor having a spiral stirrer. Referring to FIGS. 1 and 3 of U.S. Pat. No. 3,639,377, the stirrer appears to be illustrated as having a "U" shape and rotates on a vertical shaft through the bottom of vertical reactor 6. Catalyst is pumped into the reactor through the top and polymer is discharged from the reactor by means of an external cyclone. Advantageous use of high activity catalysts in a continuous polymerization process requires, however, at least a plurality of the single-stage back-mixing reactor type described in Trieschmann et al.

U.S. Pat. No. 3,944,534 (Sennari et al.) describes gas-phase polymerization of an α-olefin which is carried out in a reaction bed formed by circulation of particulate olefin polymer, caused principally by mechanical agitation to undergo circulation in the up-and-down directions within a substantially vertical-cylinder type reactor. The single-stage back-mixing reactor type described in Sennari et al. likewise is not suitable for use in a continuous polymerization process with high activity catalysts, because age of catalyst carried out of the reactor is substantially the same as the age of catalyst in a back-mixing reactor.

Vapor-phase polymerization of a polymerizable monomer or mixture thereof to produce normally solid polymer substances using a horizontal polymerization reactor containing a subfluidized particulate bed of polymerized monomer has been described in a number of patents including: U.S. Pat. No. 3,957,448 (Shepard et al.), U.S. Pat. No. 3,965,083 (Jezl et al.), U.S. Pat. No. 3,971,768 (Peters et al.), and U.S. Pat. No. 4,627,735 (Rose et al.), the disclosures of which are specifically incorporated herein in their entirety by reference. These U.S. Patents, assigned to the assignee of the present invention, describe polymerization processes and apparatus in which polymer is formed from gaseous monomer in horizontal stirredbed vessels.

In a single reactor, polymerization of monomer or mixture thereof from the vapor state is carried out by an essentially isobaric process typically using a high yield catalyst and cocatalyst. Typically, in operation of such processes and apparatus, particles of polymer are formed around solid catalyst particles.

The horizontally disposed reactor vessel has recycle gas, such as propylene, introduced into the bottom thereof. Typically, quench liquid, such as liquid propylene, is injected into the reactor from the top of the reactor.

Gases and vapors within the reactor vessel are free to circulate and mix together throughout the vapor space. For continuous production of some polymers, particularly copolymers, where it may be necessary to have different gas compositions at subsequent stages of polymerization, a series of two or more reactors is required.

Paddle wheels or other types of stirring vanes inside the vessel sweep through the bed of polymer particles and stir the contents of the vessel. The various types of stirring vanes include staggered paddles, inclined paddles, spiral vanes, or vanes provided with a scraper for scraping the internal wall of the reactor vessel.

Near one end (front end disposed opposite to a take-off end) of the horizontal vessel, a solid transition metal-containing catalyst component is injected at least one point into the top of the vessel, and an aluminum alkyl cocatalyst plus modifiers are injected at an adjacent the point at the top of the vessel.

Solid particles of polymerized monomer are created in the vessel and are withdrawn from the take-off end thereof. Particles of polymerized monomer build up in the stirred reactor and traverse the length of the reactor essentially because of polymerization in the bed and not by the agitator. Advantageously, this condition is ensured by the design of the agitator such as to provide for agitation, but not for significant backward or forward movement of the particles. Since a stirred bed is not in a fluidized condition, back-mixing of the particles of polymerized monomer in the horizontally disposed reactor vessel is limited. In contrast, solid particles in a fluidized bed are very well mixed. Even at commercially useful ratios of length to diameter, horizontal stirred-bed reactor systems can readily achieve a degree of mixing of solids equivalent to two, three, or more theoretical back-mix reactors. Thus, horizontal stirred-bed reactor systems are particularly advantageous, as compared fluidized-bed reactors, for direct production of polymers in a particulate no form.

It is desirable to create polymer particles as quickly as possible, and for this purpose a number of different high activity catalyst systems have been developed.

Use of solid, transition metal-based, olefin polymerization catalyst components is well known in the art including such solid components supported on a metal oxide, halide or other salt such as widely-described magnesium-containing, titanium halidebased catalyst components. Such catalyst components commonly are referred to as "supported."

As is well known in the art, particulate polymers and copolymers may be sticky, i.e., tend to agglomerate, due to their chemical or mechanical properties or pass through a sticky phase during the production cycle. Sticky polymers also are referred to as non-free flowing polymers because of their tendency to compact into aggregates of much larger size than the original particles and not flow out of the relatively small openings in the bottom of product discharge tanks or purge bins. Polymers of this type show acceptable fluidity in a gas phase fluidized bed reactor, however, once motion ceases, the additional mechanical force provided by the fluidizing gas passing through the distributor plate is insufficient to break up the aggregates which form and the bed will not refluidize.

Although polymers that are sticky can be produced in non-gas phase processes, there are certain difficulties associated with the production of such products in, for example, slurry or bulk monomer polymerization processes. In such processes, the diluent or solvent is present in the resins exiting the reaction system at a high concentration leading to severe resin purging problems particularly if the material in question is a low molecular weight resin or a very low crystallinity resin. Environmental considerations are such that the dissolved monomers and diluent must be removed from the polymer prior to its exposure to air. Safety also dictates the removal of residual hydrocarbons so that closed containers containing the polymers will not exceed safe levels for volatiles in the gas head space over the resin. The safety and environmental concerns are accompanied by a definite economic factor in determining a preference for a quench-cooled, vapor-phase polymerization reactor containing a subfluidized particulate bed of polymerized monomer. The low number of moving parts and the relative lack of complexity in a basic subfluidized bed process enhances the operability of the process and typically results in lower costs of production. Low costs of production are due, in part, to low volumes of recycled process streams and a high unit throughput.

Horizontal stirred-bed reactor systems disclosed in Shepard et al., Jezl et al., Peters et al., and in U.S. Pat. No. 4,101,289 ('289), U.S. Pat. No. 4,129,701 ('701), U.S. Pat. No. 4,535,134 (de Lorenzo et al.), U.S. Pat. No. 4,627,735 (Rose et al.), U.S. Pat. No. 4,640,963 (Kreider et al.), U.S. Pat. No. 4,883,847 (Leung et al.), U.S. Pat. No. 4,921,919, (Lin et al.) and U.S. Pat. No. 5,504,166 (Buchelli et al.), the disclosures of which are specifically incorporated herein in their entirety by reference, largely or completely solve problems related to vapor phase, solution or slurry polymerization and reaps important economic benefits through savings in energy consumption, raw materials, and capital costs.

Although previously-known vapor-phase polymerization systems are entirely satisfactory for manufacture of many commercial polymers, a need still exists for improved mechanical stirring in a quench-cooled subfluidized particulate bed of polymerized monomer during continuous vapor phase polymerization. Desirably, the improved process produces fewer lumps and strings of resin. Such lumps and strings tend to hang-up or become trapped in transfer equipment and can even plug lines and valves. More desirably, the improved transfer apparatus increases the range in physical properties of polymers which can be manufactured at high rates of production without interruptions in operation. Especially welcome are improved methods and apparatus which more closely achieve continuous steady-state conditions throughout the vapor-phase process and thereby produce polymer products having more uniform physical properties.

One problem with known polymerization processes and apparatus using a vapor-phase polymerization system, is that lumps and strings of resin can form in a quench-cooled subfluidized particulate bed of polymerized monomer without reliable and accurate methods for mechanical stirring. Polymers formed from alkenes of 2 to 8 carbon atoms such as propylene or a mixture of propylene and other lower alkenes often have a tendency to agglomerate under operating conditions during polymerization. Such sticky polymers are difficult to maintain in granular or particulate forms during polymerization, particularly where high rates of production are desired. Further, it is advantageous to maintain a uniform temperature profile along the reactor. Agitator apparatus according to this invention advantageously are useful for stirring of polymer particles, particularly in subfluidized particulate beds of alpha-olefin polymers in high pressure, reactive gas-filled, continuous, vapor-phase polymerization reactors.

SUMMARY OF THE INVENTION

The invention is improved apparatus for stirring polymer particles in reactive gas-filled polymerization reactors incorporating contiguous paddle stations on a coaxial drive shaft within the reactor with a plurality of sub-stations having widths along the shaft of no more than 50 percent of a paddle station thereby subdivided. Sub-station paddles attached to the shaft at each sub-station sweeping through the particulate bed in combination with wider station paddles advantageously reduce lumping of polymer particles.

One aspect of this invention is apparatus for mechanically stirring polymer particles in a horizontally disposed cylindrical polymerization reactor containing subfluidized particulate polymer bed wherein at least a portion of the heat of polymerization is removed by evaporative cooling using a readily volatilizable quench liquid. The apparatus includes: (a) a drive shaft coaxially mounted for rotation about its longitudinal axis and predominantly within a cylindrical polymerization reactor; (b) one or more classes of substantially contiguous paddle stations disposed along the drive shaft within the reactor, each station having one or more station paddles attached to the shaft so as to sweep through a cylindrical zone within the reactor thereby defining station widths along the shaft; and (c) a plurality of sub-stations having widths along the shaft of no more than 50 percent of a paddle station thereby subdivided and one or more sub-station paddles attached to the shaft at each sub-station so as to sweep through a sub-section of the cylindrical zone within the reactor.

In some embodiments, a first class of stations is, advantageously, disposed within the reactor along a portion of the drive shaft in repeating groups of at least two stations and a second class of stations with sub-stations is disposed within the reactor along another portion of the drive shaft, preferably in repeating groups of at least one more than the number of stations in the repeating group of the first class, to further reduce lumping of polymer particles.

Apparatus for mechanically stirring polymer particles according to preferred aspects of the invention have at least one class of stations which is subdivided into multiple (up to six) substations, more preferably two to about four, and the number of stations in each repeating group of the class typically is one more than the number of substations in each station.

Apparatus for mechanically stirring polymer particles in reactive gas-filled vessels according to the invention is, advantageously, used in a vapor-phase polymerization system having at least one, preferably two or more serially operated, horizontally disposed cylindrical polymerization reactors, containing a subfluidized particulate polymer bed wherein at least a portion of the heat of polymerization is removed by evaporative cooling using a readily volatilizable quench liquid. Preferably, apparatus for mechanically stirring the polymer particles includes: (a) a drive shaft being coaxially mounted for rotation about its longitudinal axis and predominantly within a cylindrical polymerization reactor; (b) one or more classes of substantially contiguous paddle stations disposed along the drive shaft within the reactor, each station having one or more station paddles with a center line located along a radius perpendicular to the longitudinal axis of the drive shaft to which it is attached and a distal end positioned in close proximity to the inner surface of the reactor wall to define by rotation a cylindrical envelope having an outer diameter which typically is at least 0.985, and preferably 0.995, times the inner diameter of the cylindrical reactor; and (c) a plurality of sub-stations having widths along the shaft of no more than 50 percent of a paddle station thereby subdivided and one or more sub-station paddle attached to the shaft at each sub-station so as to sweep through a sub-section of the cylindrical zone within the reactor.

One aspect of this invention is a process for continuous vapor phase polymerization of a polymerizable monomer or mixture thereof to produce normally solid polymer in two or more horizontally disposed cylindrical polymerization reactors wherein at least a portion of the heat of polymerization is removed by evaporative cooling using a readily volatilizable quench liquid, each containing reactive gases, a quench-cooled subfluidized mechanically-stirred bed of particulate polymer. Typically, a stirring means includes a drive shaft being coaxially mounted for rotation about its longitudinal axis and a plurality of paddles each of which has a center line located along a radius perpendicular to the longitudinal axis of the drive shaft with a distal end positioned in close proximity to the inner surface of the reactor wall so as to sweep through a cylindrical zone within the reactor. The improved process comprises providing the stirring means with two or more classes of substantially contiguous paddle stations disposed along the drive shaft within at least one reactor; multiple sub-stations, in at least one paddle station class, each substation having a width along the shaft of no more than 50 percent of the total width of a paddle station; and one or more sub-station paddles attached to the shaft at each sub-station, so as to sweep through a sub-section of the cylindrical zone within the reactor to mechanically stir the polymer particles.

Another aspect of this invention is a process for continuous polymerization wherein a first class of stations is disposed within the reactor along ¼ to ¾ of the drive shaft in repeating groups of at least two stations and a second class of stations is disposed within the reactor along ¾ to ¼ of the drive shaft in repeating groups of at least more than the number of stations in the repeating group of the first class.

Yet another aspect of this invention is a process for continuous polymerization wherein each paddle station of the first class has three flat paddles an angular intervals of one hundred twenty degrees therebetween and the angular orientation of paddles on adjacent stations of the class is sixty degrees, and each paddle station of the second class has at least a pair of flat station paddles fixed to the drive shaft at angular interval of one hundred eighty degrees therebetween and is subdivided by three substations, the number of stations in each repeating group of the class is four and the angular orientation of paddles on adjacent stations of the class is equal to 45 degrees.

For a more complete understanding of the present invention, reference should be made to the embodiments illustrated in greater detail in the accompanying drawings and described below by way of examples of the invention.

DESCRIPTION OF THE PREFERRED EMBODIMENT(S)

Apparatus for mechanically stirring polymer particles in reactive gas-filled vessels according to the invention is used advantageously in a continuous vapor-phase polymerization of at least ethylene or one alpha-olefin monomer in a reaction mixture comprising a first olefin monomer and, if copolymerization is occurring, a second olefin monomer, comprising: conducting the polymerization under polymerization conditions of temperature and pressure in the presence of hydrogen and a catalyst system comprising a solid catalyst comprising a first transition metal containing component and a cocatalyst comprising a second metal-containing component, in at least one reactor. In each such reactor at least a portion of the heat of polymerization is removed by evaporative cooling of a volatilizable quench liquid comprising liquefied first monomer and, if copolymerization is occurring, liquefied second monomer. Each reactor is a substantially horizontal reactor of substantially circular cross-section containing a centrally-located drive shaft extending longitudinally through such reactor to which are attached a plurality of adjacently located paddles. Typically, stirring causes no significant forward or backward overall movement of the particulate polymer product contained in such reactor and paddles extend transversely within and to a short distance from the internal surfaces of such reactor. However, the multiple substation paddle arrangement of this invention, does impart some forward motion to the polymer particles which is believed to be advantageous. The reactor system also includes driving means in each such reactor for the drive shaft; one or more reactor off-gas outlets spaced along the topward part of each such reactor; a plurality of vapor recycle inlets spaced along the bottomward part of each such reactor for recycle of unreacted first monomer and, if copolymerization is occurring, unreacted second monomer; one or more catalyst and cocatalyst addition inlets spaced along each such reactor; a plurality of quench liquid inlets spaced along the topward part of each such reactor whereby quench liquid can be introduced into such reactor; and a discharge or take-off means in each such reactor for the particulate polymer product at one or both ends of such reactor, preferably at one end of such reactor.

Reactive gases include, typically, at least one member of the group consisting of ethylene (ethene), propylene (propene), a butene, and mixtures thereof. In a preferred aspect of the invention the reactive gases in the upstream reactor comprise at least two polymerizable monomers.

Processes for continuous polymerization according to the present invention generally are carried out using two serially disposed vapor phase polymerization reactors in which subfluidized particulate beds of polymerized monomer are contained in a cylindrical portion of each polymerization reactor with a horizontally disposed axis of rotation. These reactors have, typically, the same nominal dimensions, such as, length and diameter. The axis of rotation of the upstream reactor can, advantageously, be disposed at an elevation the same as or higher than the axis of rotation of the downstream reactor.

The continuous, vapor-phase polymerization system described herein can be applied to the polymerization of polymerizable monomers which are polymerizable below the softening point of their polymer forms including ethylene, propylene, 4-methyl-pentene-1, butene-1, vinyl chloride, butadiene, and mixtures of such monomers. Particularly suitable are the polymerization of ethylene and propylene.

Processes according to the present invention are, advantageously, used for continuous polymerization of two monomers. Preferably, the polymerizable monomers are ethene and propene, more preferably, the composition of the gas phase in the upstream reactor is predominantly propene.

The subfluidized particulate beds of polymerized monomer are mechanically stirred and have a free surface within each reactor. Transfer of polymer particles is, advantageously, carried out discharging mixture of polymer particles and reactive gases from the upstream reactor through an outlet port located in the reactor wall at an elevation below the free surface of the subfluidized bed of polymerized monomer therein.

Suitable rates of quench liquid addition preferably are large enough to obtain the maximum cooling effect of the quench liquid, but low enough to keep the particulate bed of polymerized monomer dry. Generally, the quench liquid carries away 50 percent or more of the heat of polymerization.

According to the invention there is provided a reactor system and process which can economically and efficiently convert a polymerizable monomer or a mixture thereof to polymer substances in a vapor phase, essentially isobaric polymerization process, which reactor is a subfluidized stirred-bed, quench-cooled, horizontal reactor with essentially total reactor off-gas recycle capable of multiple temperature operation. The apparatus is, generally, characterized by a stirred agitation of the quench-cooled polymer bed contained in therein by transversely oriented paddles connected to a longitudinally oriented drive shaft typically located centrally in the reactor.

According to the invention, the continuous, vapor-phase polymerization system is characterized by having at least one horizontally disposed polymerization reactor section containing a mechanically-stirred subfluidized particulate polymer bed wherein at least a portion of the heat of polymerization is removed by evaporative cooling using a readily volatilizable quench liquid. Mechanical agitation of the polymer bed is, generally, by transversely oriented paddles connected to a longitudinally oriented drive shaft typically located centrally in the reactor. The reactor is segmented into two or more polymerization sections which, optionally, can be separated one from another by suitable barriers such as weirs.

Apparatus of the present invention is employed with at least one substantially horizontal reactor of substantially circular cross-section containing a centrally-located drive shaft extending longitudinally through each such reactor, to which are attached a plurality of adjacently located paddles, which paddles extend transversely within and to a short distance from the internal surfaces of such reactor; driving means in each such reactor for the drive shaft; one or more reactor off-gas outlets spaced along the topward part of each such reactor; a plurality of vapor recycle inlets spaced along the bottomward part of the reactor; one or more catalyst and cocatalyst addition inlets spaced along each such reactor; a plurality of quench liquid inlets spaced along the topward part of each such reactor whereby quench liquid can be introduced into each such reactor; and take-off means in each such reactor for the particulate product at one or both ends, preferably at one end of such reactor.

Figure 1:
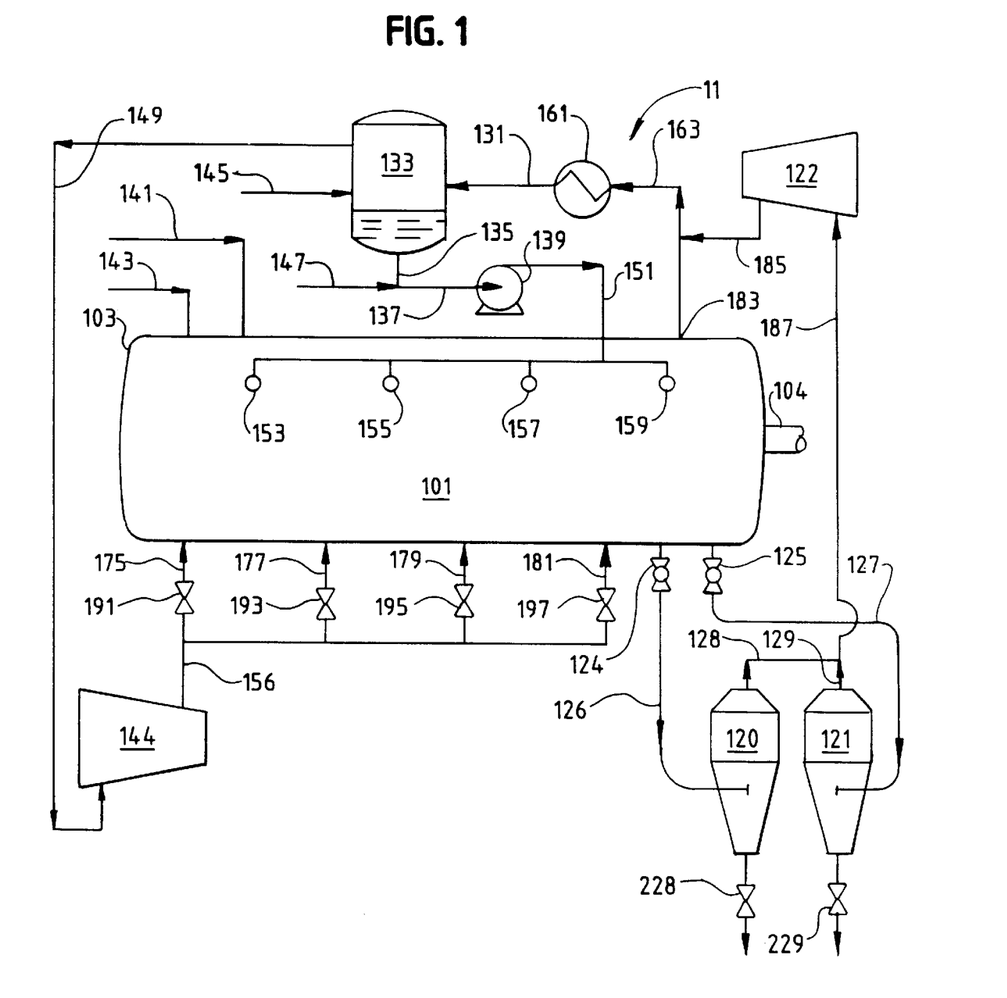
FIG. 1 shows one embodiment of a vapor-phase polymerization system having a horizontally disposed polymerization reactor containing a mechanically-stirred, subfluidized particulate polymer bed wherein at least a portion of the heat of polymerization is removed by evaporative cooling using a readily volatilizable quench liquid, with essentially total reactor off-gas recycle, useful in explaining the invention.

Referring now to the drawings in greater detail, there is illustrated in FIG. 1 a vapor-phase polymerization system. A horizontally disposed polymerization reactor containing a mechanically-stirred, subfluidized particulate polymer bed wherein at least a portion of the heat of polymerization is removed by evaporative cooling using a readily volatilizable quench liquid, with essentially total reactor off-gas recycle, is, generally, indicated by the numeral 11.

In FIG. 1, the vessel, where polymerization occurs, is a horizontal cylindrical reactor 101, which contains, for example, polypropylene powder which is stirringly agitated by the paddles and drive means (not shown in FIG. 1) of shaft 104. Reaction volume of the horizontal polymerization reactor operates as a series of several stirringly agitated sections to provide for the possibility of operating the different sections of the reactor at different temperatures. Polymerization takes place in all reaction sections to form a particulate polymer bed distributed throughout the reactors. Powder level in reactor 101 generally is maintained at approximately 40 to 80 percent of the total reactor volume.

Reactor 101 typically operates under an internal pressure of about 200 to about 400 psig (1400 to 2800 kPa) and at a temperatures in a range of about 50 to about 90° C. during production of polypropylene. Polymerization temperatures in each of the sections can be individually controlled by a combination of techniques including the controlled differential introduction of vapor recycle from compressor 144 via conduit 156 into each of the sections through inlets 175, 177, 179, and 181 spaced along the bottom of the reactor from conduit 156 by means of valves 191, 193, 195, and 197, respectively, and the introduction into each of the sections of quench liquid at different rates through quench liquid inlets 153, 155, 157, and 159. Catalyst, cocatalyst and/or modifier systems are introduced into reactor 101, near front end 103 thereof, through inlet conduits 141 and 143 spaced along the top of the reactor.

Reactor off-gases are removed through outlet 183. Certain deleterious amounts of polymer fines are, typically produced in vapor-phase polymerization reactors. Advantageously, polymer fines are substantially removed prior to cooling of reactor off-gases in off-gas cooler/condenser 161, by using traps, filters, settlers, cyclones, or scrubbers or a combination thereof. Effluent from off-gas cooler/condenser 161 is transferred via conduit 131 into gas-liquid separator 133. Monomers are supplied from storage (not shown) via conduit 147 and combined with condensed liquid via conduit 135 from separator 133 to suction of pump 139 via conduit 137. Pump 139 delivers quench liquid to quench liquid inlets 153, 155, 157, and 159 via conduit 151.

Polymer solid is produced in each of the stirringly agitated reaction sections. Due to continued production of such polymer, an amount of polymer product constantly passes to the take-off end disposed opposite the front end 103 of the reactor 101. Dual trains of apparatus for discharge of polymer particles from high pressure, reactive gas-filled, continuous, vapor-phase polymerization reactor are depicted in FIG. 1.

A cycle begins, for example, by brief openings of outlet valve 124 (or 125) to discharge one or more slugs containing polymer particles and reactive gases from the reactor through an outlet port located in the reactor wall at an elevation below the free surface of the subfluidized bed of polymerized monomer therein. Polymer particles are transferred through conduit 126 (or 127) into gas-solid separator 120 (or 121) which is maintained at a suitably lower pressure than reactor 101. Periodically polymer particles separated from reactive gases, are discharged through valves 228 (or 229).

Reactive gases are recycled to the reactor via gas-solid separator 120 (or 121), conduit 128 (or 129) and conduit 187 to suction of gas compressor 122. Effluent from gas compressor 122 flows via conduit 185 and conduit 163 into cooler/condenser 161. Monomer and/or other gases useful to control the polymerization process, may be introduced into separator 133 from storage (not shown) via conduit 145. Recycle gases from separator 133 flow to compressor 144 via conduit 149.

Figure 2:
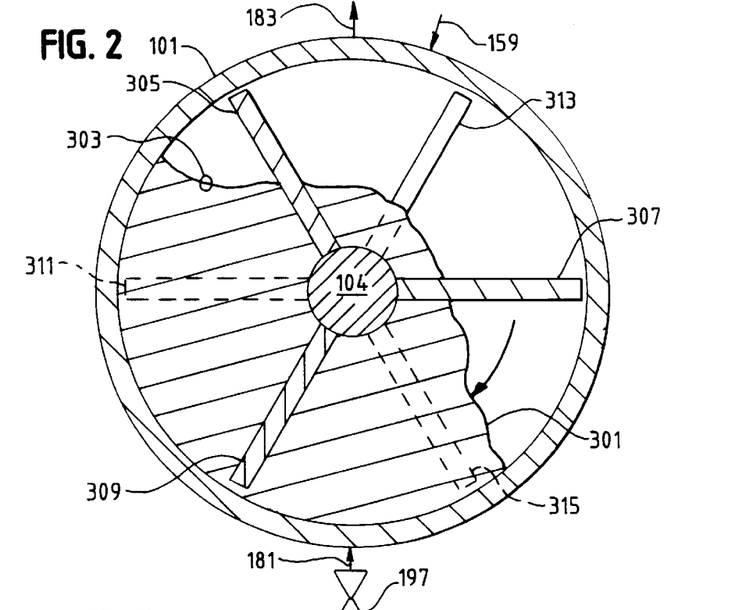
FIG. 2 is a transverse cross-sectional view of the polymerization reactor in FIG. 1, illustrating one embodiment of a paddle wheel agitator for mechanically stirring a particulate bed of polymerized monomer in accordance with the present invention.

FIG. 2 is a transverse cross-sectional view near the down-stream end of the polymerization reactor in FIG. 1, illustrating one embodiment of a paddle wheel agitator for mechanically stirring a particulate bed of polymerized monomer in accordance with the present invention. In this section of the reactor the agitator has three paddles at each station along shaft 104 and a repeating group of two stations. The sixty degree orientation of the paddles 305, 307, 309 and 311, 313, 315, respectively, on adjacent stations at the take-off end, and the orientation of the free surface 303 of the polymer bed 301 in the reactor 101 and the direction of paddle movement with respect to the bed orientation are shown. Also, FIG. 2 illustrates a quench liquid inlet 153, an off-gases outlet 183, a vapor recycle inlet 181, and a valve 197.

Stirring action of paddles rotating downward through the bed of particulate polymer in reactor 101 in FIG. 2 displace the free surface of the bed in the direction of paddle rotation. The free surface of the bed 301 at the reactor wall in the lower-right quadrant of the reactor cross-section is displaced downward, away from an undisturbed angle of particle repose. During continuous operation of the polymerization system, paddles rotate from the quench-cooled vapor space, drive through the lower free surface, and stir quench-cooled particles from the surface into the bed. As particles are stirred through the bed generally in the direction of paddle rotation and upward into upper-left quadrant of the reactor cross-section, local temperatures in the bed, particularly near the wall of the reactor, increase due to heat generated by polymerization and other factors such as a lower amount of cooling from the quench liquid than falls upon the free surface of the bed. At or near the upper free surface 303, particles are again subjected to quench liquid and quench-cooled vapor by the stirring action of paddles.

Figure 3:
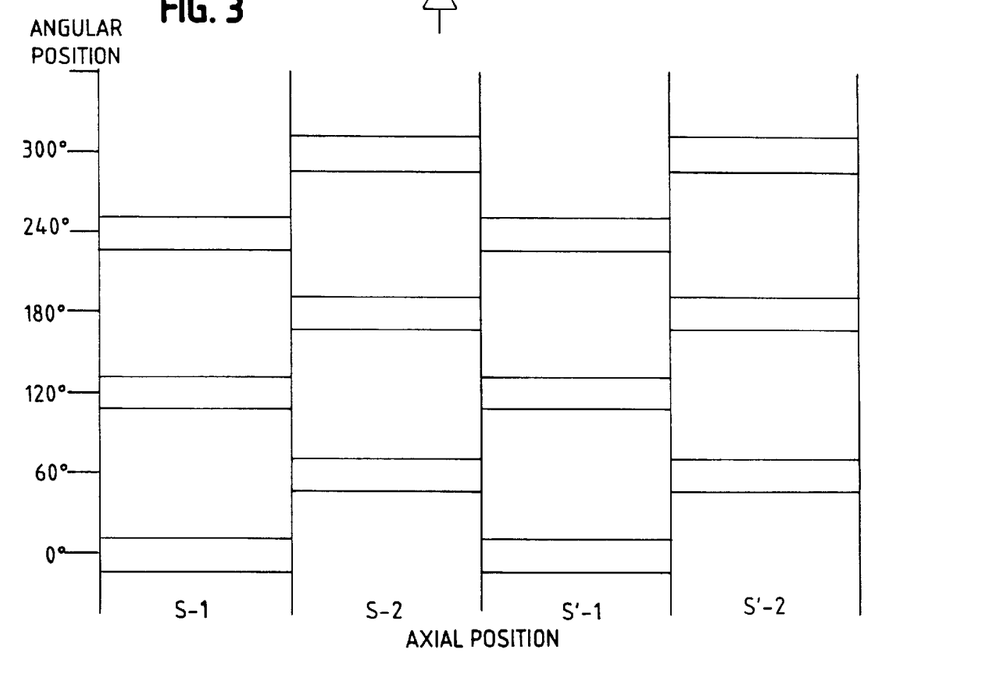
FIG. 3 is a diagram of paddle layout for a section of reactor agitator having three paddles at each station along the drive shaft and a repeating group of two stations as illustrated in FIG. 2.

FIG. 3 shows a preferred paddle layout for a section of reactor agitator having three paddles at each station S along the drive shaft and a repeating group of two stations as illustrated in FIG. 2. Stations S-1 and S-2 are a repeating group which is followed by another repeating group, S'-1 and S'-2. At each station three flat paddles preferably are positioned at equal angular intervals of 120° around the shaft. The angular orientation of paddles on adjacent station is equal to 360°/(3×2), i.e. sixty degrees.

Figure 4:
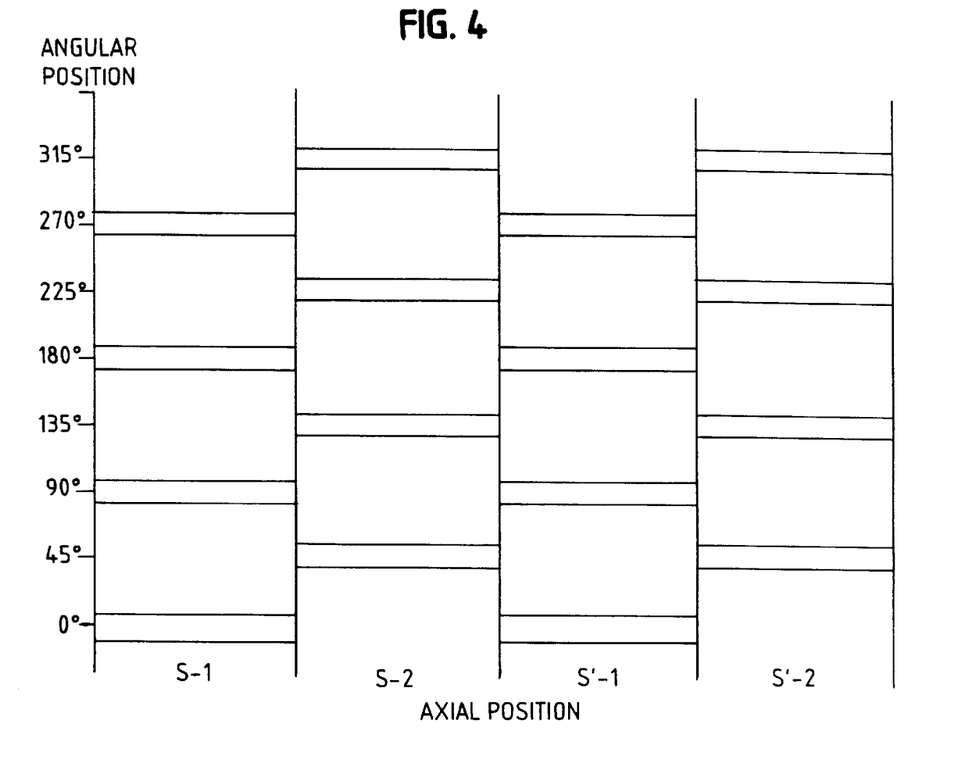
FIG. 4 is a diagram of paddle layout for a section of reactor agitator having four paddles at each station along the drive shaft and a repeating group of two stations.

FIG. 4 is a diagram of paddle layout for a section of reactor agitator having four paddles at each station along the drive shaft and a repeating group of two stations. In FIG. 4 stations S-1 and S-2 form the general repeating group which is followed by another repeating group, S'-1 and S'-2. At each station four flat paddles are, preferably, positioned at equal angular intervals of 90° around the shaft. The angular orientation of the paddles on adjacent stations is at 360°/(4×2), i.e. forty five degrees. This layout is illustrated in FIG. 5.

Figure 5:
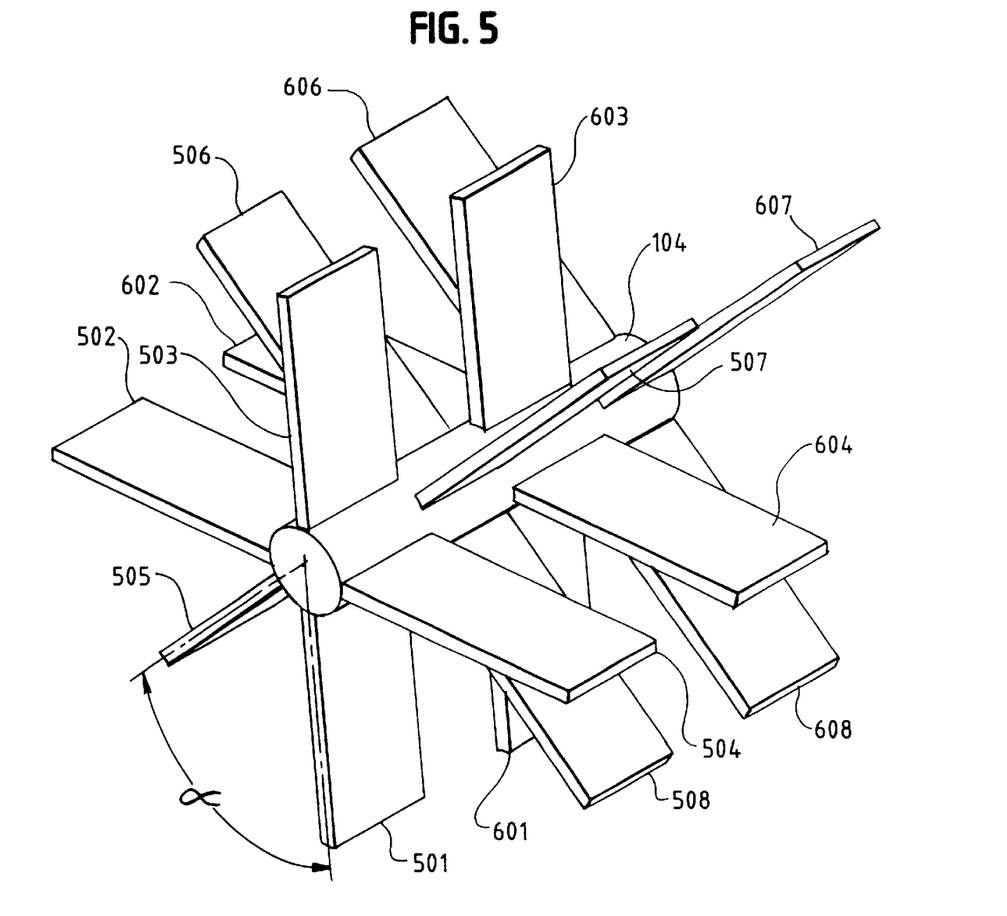
FIG. 5 is an illustration of a section of reactor agitator having four paddles at each station along the drive shaft and a repeating group of two stations which is diagrammed in FIG. 4.

As shown in FIG. 5 each station has four flat paddles positioned at equal angular intervals of 90° around shaft 104. Paddles 501, 502, 503, and 504, defining a first paddle station, together with paddles 505, 506, 507, and 508, defining a second paddle station, form a repeating group of two stations. Paddles 601, 602, 603, and 604, defining another first paddle station, together with paddles 605 (hidden behind shaft 104) 606, 607, and 608, defining another paddle station, form an adjacent repeating group of two stations. In FIG. 5 "α" (alpha) is the 45° angular orientation of the paddles on adjacent stations.

Figure 6:
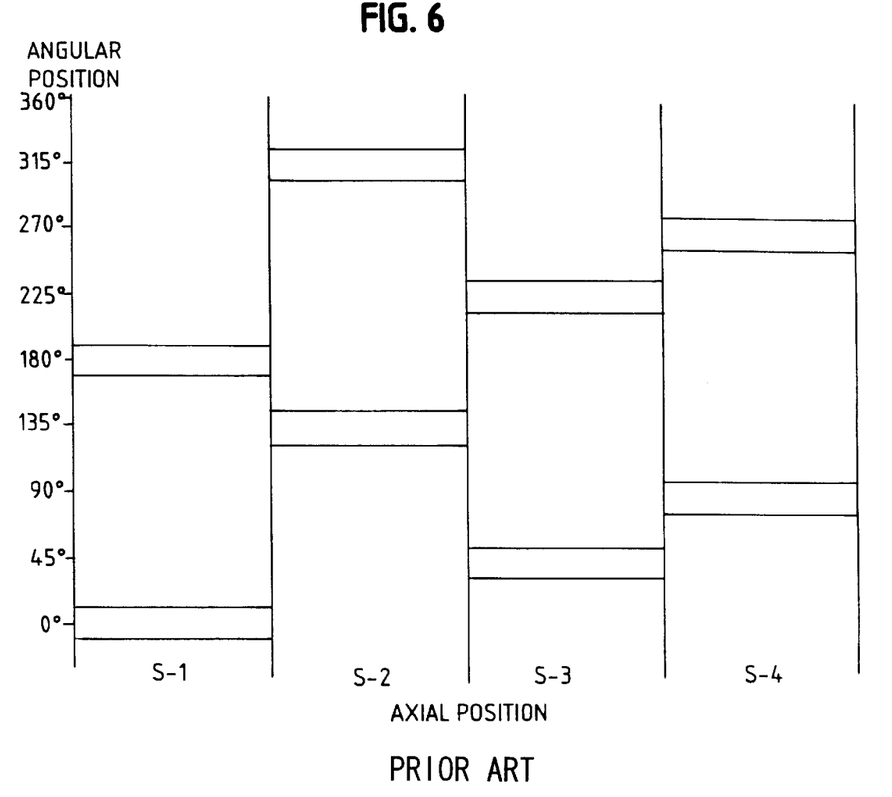
FIG. 6 is a diagram of paddle layout for a reactor agitator having two paddles at each station along the drive shaft and a repeating group of four stations (prior art).

FIG. 6 is a diagram of paddle layout for a reactor agitator having two paddles at each station along the drive shaft and a repeating group of four stations. In FIG. 6 stations S-1, S-2, S-3 and S-4 form the general repeating group which is followed by other repeating group (not shown). At each station two flat paddles are, preferably, positioned at equal angular intervals of 180° around the shaft. The angular orientation of the paddles is at intervals of 360°/(2×4), i.e. forty five degrees, ninety degrees, and one hundred thirty five degrees.

Figure 7:
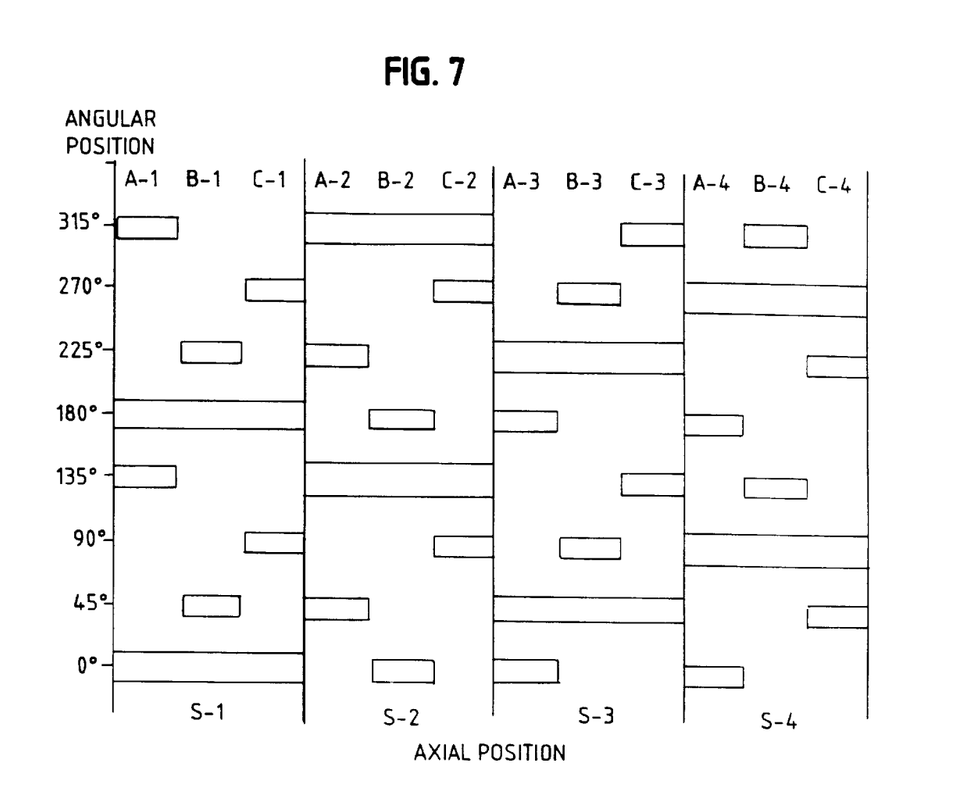
FIG. 7 is a diagram of paddle layout for a section of reactor agitator having two wide paddles at each station along the drive shaft and a repeating group of four stations which is diagrammed in FIG. 6. Furthermore, in accordance with the invention stations are divided into three sub-stations each of which has two sub-station paddles.

FIG. 7 is a diagram of paddle layout for a section of reactor agitator having two wide paddles at each station along the drive shaft and a repeating group of four stations, S-1, S-2, S-3 and S-4 as shown in FIG. 6. Furthermore, in accordance with the invention stations are divided into multiple sub-stations A, B, and C. Each sub-station has two flat sub-station paddles positioned at equal angular intervals of 180° around the shaft. The angular orientation of the paddles is on intervals of 360°/(2×4), i.e. forty five.

Figure 8:
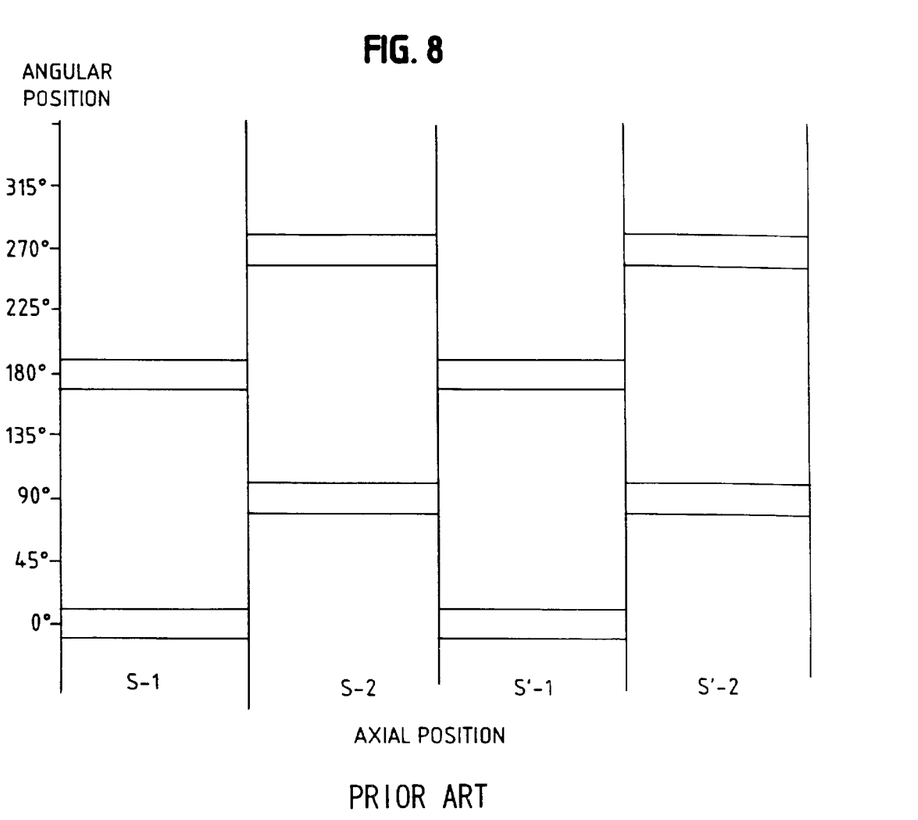
FIG. 8 is a diagram of paddle layout for a reactor agitator having two paddles at each station along the drive shaft and a repeating group of two stations. This layout has been proposed in several U.S. patents, e.g., in Shepard et al. and Jezl et al.

FIG. 8 is a diagram of paddle layout for a reactor agitator having two paddles at each station along the drive shaft and a repeating group of two stations. In FIG. 8 stations S-1 and S-2 form the general repeating group which is followed by another repeating group, S'-1 and S'-2. At each station two flat paddles are, preferably, positioned at equal angular intervals of 180° around the shaft. The angular orientation of the paddles on adjacent stations is at 360°/(2×2), i.e. ninety degrees. This paddle wheel design without substations has been proposed in several U.S. patents, e.g., in Shepard et al. and Jezl et al.

Typically, it is desirable that stirring of the subfluidized bed causes no significant forward or backward overall movement of the particulate polymer product contained in a vapor-phase polymerization reactor. Overall movement of particulate polymerized monomer is best modeled as "plug-flow" or as a series of many "perfectly" mixed zones. Station paddles of at least one, preferably every, class of stations have a center line located along a radius perpendicular to the longitudinal axis of the drive shaft with a distal end positioned in close proximity to the inner surface of the reactor wall. Preferably, at least one class has paddles which are symmetrical about a plane containing its a center line and perpendicular to the no longitudinal axis of the drive shaft. Station paddles of at least one, preferably every, class of stations have paddles which are essentially flat.

Advantageously, a paddle class containing two to four substations according to this invention does impart limited axial movement during operation. Such movement typically is limited to about one paddle width. This class of paddle stations also may be characterized as having paddles asymmetrical about a plane containing a center line of a paddle and perpendicular to the longitudinal axis of the drive shaft. The advantage of this limited axial movement is better catalyst dispersal in the region of catalyst injection. This limited movement does not create a well mixed system as is present in a fluidized bed system.

Apparatus for mechanically stirring the polymer particles according to preferred aspects of the invention has at least one class of stations including at each station at least a pair of paddles fixed to the drive shaft at angular interval of one hundred eighty degrees therebetween and extending outwardly form the shaft to a distal end in a closely spaced, sweeping relationship to the cylindrical reactor wall.

In some preferred aspects of the invention at least one class of stations has at least three flat paddles. The three flat paddles of such stations are, preferably, positioned at an angular intervals of one hundred twenty degrees around the drive shaft. Preferably, the angular orientation of paddles on adjacent stations of the three paddle class is sixty degrees.

Apparatus for mechanically stirring the polymer particles according to preferred aspects of the invention has a first class of stations disposed within the reactor along ⅕ to ⅘ of the drive shaft in repeating groups of at least two stations and a second class of stations disposed within the reactor along ⅘ to ⅕ of the drive shaft in repeating groups of more than the number of stations in the repeating group of the first class. More preferably the first class of stations is disposed along ⅖ to ⅗ of the drive shaft in repeating groups of two stations each and the angular orientation of paddles on adjacent stations is equal to 15° times an integer of from 1 to 23.

Apparatus for mechanically stirring polymer particles according to preferred aspects of the invention have a class of stations which are subdivided by up to four or more substations. Typically, the number of stations in each repeating group of the class is one more than the number of substations at each station in that class. Advantageously, such class of subdivided stations is disposed along the drive shaft so as to sweep through any cylindrical zone which receives substantially fresh catalyst.

Another class of paddles in a preferred apparatus of the invention has two to about four flat paddles, preferably three flat paddles in each station at angular intervals of one hundred twenty degrees around the drive shaft. More preferably, such stations in this class are disposed along the downstream portion of the drive shaft in repeating groups of two stations each and angular orientation of paddles on adjacent stations of the class is sixty degrees.

In another aspect of the invention, of which an embodiment is illustrated in FIG. 7, one or more substation paddles attached to the drive shaft are disposed in one or more planes including said axis of said drive shaft.

Advantageously, paddles are distributed to define by rotation a cylindrical envelope having an outer diameter which typically is at least about 0.985 times the inner diameter of the cylindrical reactor in which the paddles are rotated, preferably at least about 0.995 times the inner diameter, and more preferably even up to about 0.999 times the inner diameter. The length of the paddles which define the rotation envelope is sufficient to assure that polymer is swept from the inner surface of the reactor during rotation.

The distal end of each blade during rotation of the drive shaft has, preferably, a velocity in a range upward from about 15 m/min (50 ft/min), preferably a range from about 45 to about 180 m/min. (150–600 ft/min) and higher, and more preferably a range from about 90 to about 170 m/min (300–550 ft/min).

As employed herein, unless otherwise indicated, the term "polymerization" is intended to include both homopolymerization and copolymerization, and the term "polymer" is intended to include both homopolymer and copolymer.

The method of this invention is useful in the stereospecific polymerization of alpha-olefins containing 3 or more carbon atoms such as propylene, butene-1, pentene-1, 4-penteneentene-1, and hexene-1, as well as mixtures thereof and mixtures thereof with ethylene. The method of this invention is particularly effective in the stereospecific polymerization of propylene or mixtures thereof with ethylene or a higher alpha-olefin. According to the invention, highly crystalline polyalpha-olefin homopolymers or copolymers are prepared by contacting at least one alpha-olefin with the catalyst described hereinbelow under polymerization conditions. Such conditions include polymerization temperature and time, pressure(s) of the monomer(s), avoidance of contamination of catalyst, the use of chain transfer agents to control polymer molecular weights, and other conditions well known to persons skilled in the art.

The amount of the catalyst or catalyst component to be employed in the method of this invention varies depending on choice of reactor size, monomer to be polymerized, the specific catalyst used, and other factors known to persons of skill in the art. Typically, a catalyst or catalyst component is used in amounts ranging from about 0.2 to about 0.02 milligrams of catalyst to gram of polymer produced.

Use of solid, transition metal-based, high activity, olefin polymerization catalyst components is preferable in the reactor system described in this invention and is well known in the art including such solid components supported on a metal oxide, halide or other salt such as widely-described magnesium-containing, titanium halide-based catalyst components. Numerous supported, magnesium-containing, titanium-containing, electron donor containing olefin polymerization or copolymerization catalysts have been disclosed. For example, Arzoumanidis et al., U.S. Pat. No.

4,866,022, incorporated by reference herein, discloses a method for forming an advantageous alpha-olefin polymerization or copolymerization catalyst or catalyst component useful in this invention. In addition to the solid, magnesium containing, titanium containing catalyst component, the polymerization catalyst system used to produce propylene polymers uses an aluminum alkyl component, such as triethylaluminum, and typically an external modifier component such as a silane compound as described in U.S. Pat. No. 4,829,038, incorporated by reference herein.

Preferred catalysts and cocatalysts are high yield catalysts. "High yield" means that the residues of catalysts and cocatalysts do not have to be removed from the polymer products in a separate "deashing" process. Yields of such catalyst typically exceed 5000 grams of polymer per gram of catalyst and preferably exceed 15,000 grams of polymer per gram of catalyst.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of strings and lumps due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Alpha-olefin polymerization or copolymerization according to this invention is carried out at monomer pressures of about atmospheric or above. Generally, monomer pressures range from about 20 psi to about 600 psi (140 kPa to 4100 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours.

Examples of gas-phase polymerization or copolymerization processes in which such catalyst or catalyst component is useful are described in U.S. Pat. Nos. 3,957,448; 3,965,083; 3,971,786; 3,970,611; 4,129,701; 4,101,289; 3,652,527; 4,003,712; 4,326,048; 4,337,069; 4,535,134; 4,569,809, 4,610,574; 4,640,963; 4,708,787; 5,209,607; and 5,504,166, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

Irrespective of polymerization or copolymerization technique, polymerization or copolymerization is carried out under conditions that exclude oxygen, water, and other materials that act as catalyst poisons. Also, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymer or copolymer products produced in the presence of the invented catalyst can be fabricated into useful articles by extrusion, injection molding, and other common techniques.

In view of the features and advantages of the method and apparatus for mechanically stirring the polymer particles in accordance with this invention as compared to other agitators previously proposed and/or employed in a vapor-phase polymerization system having at least one horizontally disposed cylindrical polymerization reactor containing subfluidized particulate polymer bed wherein at least a portion of the heat of polymerization is removed by evaporative cooling using a readily volatilizable quench liquid, the following examples are given.

EXAMPLES

In the following demonstrations of agitator performance, a pilot-scale continuous vapor-phase polymerization system was used. The system included two serially disposed, horizontal, cylindrical polymerization reactors containing subfluidized particulate polymer bed wherein a portion of the heat of polymerization was removed by evaporative cooling using a readily volatilizable quench liquid, to produce polypropylene powder or a random copolymer of propylene containing approximately 3 wt % ethylene. Apparatus for mechanically stirring the polymer particles in each reactor including a drive shaft being coaxially mounted for rotation about its longitudinal axis, and stirring means including a plurality of paddles each of which has a center line located along a radius perpendicular to the longitudinal axis of the drive shaft with a distal end positioned in close proximity to the inner surface of the reactor wall so as to sweep through a cylindrical zone within the reactor.

Each agitator was evaluated, under the same conditions of operation at production rate of 100 lb/hr (45 Kg/hr), in a series of four periods of 12 hours duration where reactor control temperatures were raised in increments of 5°F. (2.8° C.). Production of strings and lumps was monitored by screening reactor discharge through 3/16' (5 mm) mesh screen during intervals of about 1 hour. After the experiment for each agitator, all powder was removed from the reactor. The agitator was replaced and the reactor recharged with powder for the next test.

Example 1

In this example the test program described above was used to evaluate a reactor agitator having two paddles at each station along the drive shaft with axial length of each station equal to ⅛ of reactor diameter and a repeating group of four stations. The angular orientation of the paddles was at intervals of 360°/(2×4), i.e. forty five, as shown in FIG. 6. The ratios of the amount of quench fluid entering into the reactor through three nozzles positioned along the reactor was: 44:33:23. Since the amount of quench fluid used is related to the temperature in a quench zone, this indicates a temperature profile in which the front of the reactor is hotter than the discharge end.

Example 2

In this example the test program described above was use to evaluate a reactor agitator having two wide paddles at each station along the drive shaft with axial length of each station ¼ of reactor diameter and a repeating group of four stations. In accordance with the invention, the stations were divided into three sub-stations each of which had two sub-station paddles. The angular orientation of the paddles was on intervals of 360°/(2×4), i.e. forty five, as shown in FIG. 7. The ratios of the amount of quench fluid entering into the reactor through three nozzles positioned along the reactor was: 35:34:31. This indicates a substantially flat temperature profile along the reactor.

Examples 3 to 8

In following demonstrations of agitator performance without polymerization a model of a reactor for continuous vapor-phase polymerization system was employed. The system included a horizontally disposed, cylindrical reactor having a ratio of length to diameter of 3:1 and contained subfluidized particulate polymer bed of polypropylene powder. Apparatus for mechanically stirring the polymer particles in the model reactor included a drive shaft being coaxially mounted for rotation about its longitudinal axis, and stirring means including a plurality of paddles each of which has a center line located along a radius perpendicular to the longitudinal axis of the drive shaft with a distal end positioned in close proximity to the inner surface of the reactor wall so as to sweep through a cylindrical zone within the reactor.

The test program evaluated each agitator's capability for moving a single radioactive particle within a bed of polypropylene powder under controlled test conditions which included powder inventory at 50 percent of reactor volume and rotation of drive shaft at 40 rpm. By means of position emission tomography the location of the radioactive particle (its coordinates in three dimension) was determined for a series of time steps. Analysis of these data included calculation of average axial velocity and axial distance covered as the particle moved one orbit around the mixer. Results are summarized in Table I.

TABLE I

| ID No. | Paddles/ Station | Stations/ Repeat Group | Paddle Width/ Diameter | Axial Velocity, mm/sec. | Axial Distance, mm |
|---|---|---|---|---|---|
| I | 3 | 2 | ⅛ | 45 | 33.0 |
| II | 4 | 2 | ⅛ | 49 | 40.6 |
| III | 2 | 4 | ¼ | 97 | 86.4 |
| IV | 2 | 4 | 1/16 | 36 | 35.6 |
| V | 2 | 4 | ⅛ | 60 | 81.3 |
| VI | 2 | 4 | ¼ & 1/12 | 64 | 91.4 |

Reactor agitator identified as I had three paddles at each station along the drive shaft and a repeating group of two stations as illustrated in FIG. 3. The paddle width was ⅛ of reactor diameter and angular orientation of the paddles on adjacent stations is at 360°/(3×2), i.e. sixty degrees.

Reactor agitator identified as II had four paddles at each station along the drive shaft and a repeating group of two stations as illustrated in FIG. 4. Paddle width was ⅛ of reactor diameter and angular orientation of the paddles on adjacent stations is at 360°/(4×2), i.e. forty five degrees. This layout is illustrated in FIG. 5.

Reactor agitators identified as III, IV and V had two paddles at each station along the drive shaft and a repeating group of four stations as illustrated in FIG. 6. Paddle width ranged from 1/16 to ¼ of reactor diameter as reported in Table I and angular orientation of the paddles is at intervals of 360°/(2×4), i.e. forty five.

Reactor agitator identified as VI had two paddles at each station along the drive shaft and a repeating group of four stations. Station paddle width was ¼ of reactor diameter. Furthermore, in accordance with the invention stations were divided into three sub-stations. Each sub-station had two flat sub-station paddles positioned at equal angular intervals of 180° around the shaft. The angular orientation of the paddles was on intervals of 360°/(2×4), i.e. forty five. This layout is illustrated in FIG. 7.

For the purposes of the present invention, "predominantly" is defined as more than about fifty percent. "Substantially" is defined as occurring with sufficient frequency or being present in such proportions as to measurably affect macroscopic properties of an associated compound or system. Where the frequency or proportions for such impact is not clear, substantially is to be regarded as about ten percent or more. "Essentially" is defined as absolutely except that small variations which have no more than a negligible effect on macroscopic propertied and final outcome are permitted, typically up to about one percent.

That which is claimed is:

1. Apparatus for mechanically-stirring polymer particles in a vapor-phase polymerization system having at least one horizontally disposed cylindrical polymerization reactor containing subfluidized particulate polymer bed wherein at least a portion of the heat of polymerization is removed by evaporative cooling using a readily volatilizable quench liquid, comprising:

a drive shaft being coaxially mounted for rotation about its longitudinal axis and predominantly within a substantially horizontal cylindrical polymerization reactor having a cylindrical reactor wall and inner diameter;

one or more classes or substantially contiguous paddle stations disposed along the drive shaft within the reactor, each station having one or more station paddles attached to the shaft so as to sweep through a cylindrical zone within the reactor thereby defining station lengths along the shaft; and a plurality of sub-stations in at least one of said paddle station classes, each sub-station having lengths along the shaft of no more than 50 percent of total width of the paddle station, and one or more sub-station paddles attached to said drive shaft at each sub-station so as to sweep through a sub-section of the cylindrical zone within the reactor, said one or more substation paddles being disposed in one or more planes including said axis of said drive shaft.

2. The apparatus for mechanically stirring the polymer particles according claim 1 wherein said station paddles of at least one of said classes of stations each have a center line located along a radius perpendicular to the longitudinal axis of the drive shaft with a distal end positioned in close proximity to an inner surface of the cylindrical reactor wall.

3. The apparatus for mechanically stirring the polymer particles according to claim 1 wherein at least one of said classes of stations has at least a pair of paddles fixed to the drive shaft at angular interval of one hundred eighty degrees around the shaft and extending outwardly from the shaft to a distal end in a closely spaced, sweeping relationship to an inner surface of the cylindrical reactor wall.

4. The apparatus for mechanically stirring the polymer particles according to claim 1 wherein a first class of said stations is disposed within the reactor along about 1/5 to 4/5 of the drive shaft in repeating groups of at least two of said stations and a second class of said stations is disposed within the reactor along about 4/5 to 1/5 of the drive shaft in repeating groups of at least more than the number of said stations in the repeating group of the first class.

5. The apparatus for mechanically stirring the polymer particles according to claim 4 wherein the paddles are distributed to define by rotation a cylindrical envelope having an outer diameter which is at least 0.985 times the inner diameter of the cylindrical reactor in which the paddles are rotated.

6. The apparatus for mechanically stirring the polymer particles according to claim 4 wherein at least the first class of said stations is subdivided by up to six of said substations and the number of said stations in each repeating group of the first class is more than the number of said substations in each of said stations.

7. The apparatus for mechanically stirring the polymer particles according to claim 4 wherein each of the first class of paddle stations has from two to about four essentially flat paddles each having a center line located along a radius perpendicular to the longitudinal axis of the drive shaft with a distal end positioned in close proximity to an inner surface of the cylindrical reactor wall.

8. The apparatus for mechanically stirring the polymer particles according to claim 7 wherein the first class of stations is disposed along 2/5 to 3/5 of the drive shaft in repeating groups of two stations each and the paddles on adjacent stations having an angular orientation which is equal to 15° times an integer of from 1 to 23.

9. The apparatus for mechanically stirring the polymer particles according to claim 7 wherein the first class of stations have essentially flat paddles at angular intervals of one hundred twenty degrees around the drive shaft and paddles on adjacent stations of the first class have an angular orientation of sixty degrees.

10. The apparatus for mechanically stirring the polymer particles according to claim 9 wherein the second class of stations is subdivided by up to four substations and the number of stations in each repeating group of the second class is one more than the number of substations in each station.

11. Apparatus for mechanically stirring polymer particles in a vapor-phase polymerization system having at least one horizontally disposed cylindrical polymerization reactor containing subfluidized particulate polymer bed wherein at least a portion of the heat of polymerization is removed by evaporative cooling using a readily volatilizable quench liquid, comprising:

a drive shaft coaxially mounted along its longitudinal axis and predominantly within a cylindrical substantially horizontal polymerization reactor having a cylindrical reactor wall and inner diameter;

one or more classes of substantially contiguous paddle stations disposed along the drive shaft within the reactor, each station having one or more station paddles with a center line located along a radius perpendicular to the longitudinal axis of the drive shaft to which it is attached and a distal end positioned in close proximity to the inner surface of the cylindrical reactor wall to define by rotation a cylindrical envelope having an outer diameter which is at least 0.995 times the inner diameter if the cylindrical reactor; and a plurality of sub-stations in at least one of said paddle station classes, each sub-station having a width along the shaft of no more than 50 percent of the paddle station, and one or more sub-station paddles attached to said drive shaft at each sub-station so as to sweep through a sub-section of the cylindrical zone within the reactor, said one or more substation paddles being disposed in one or more planes including said axis of said drive shaft.

12. The apparatus for mechanically stirring the polymer particles according to claim 11 further comprising drive means such that the distal end of each blade during rotation of the drive shaft has a velocity in a range of from about 45 m/min to about 180 m/min.

13. The apparatus for mechanically stirring the polymer particles according to claim 11 wherein a first class of said stations is disposed within the reactor along 1/4 to 3/4 of the drive shaft in repeating groups of at least two stations and a second class of stations is disposed within the reactor along 3/4 to 1/4 of the drive shaft in repeating groups of at least more than the number of said stations in repeating group of the first class.

14. The apparatus for mechanically stirring the polymer particles according to claim 13 wherein at least the first class of stations is subdivided by up to four substations and the number of stations in each repeating group of the first class is one more than the number of substations in each station.

15. The apparatus for mechanically-stirring the polymer particles according to claim 13 wherein each of the second class of paddle stations has at least a pair of essentially flat station paddles fixed to the drive shaft at angular interval of one hundred eighty degrees around the drive shaft and is subdivided by three substations, the number of stations in each repeating group of the second class is four and angular orientation of paddles on adjacent stations of the class is equal to 45 degrees.

16. The apparatus for mechanically stirring the polymer particles according to claim 15 wherein each of the first class of paddle stations has three essentially flat paddles an angular intervals of one hundred twenty degrees around the drive shaft and angular orientation of paddles on adjacent stations of the first class is sixty degrees.

17. Apparatus for mechanically-stirring polymer particles in a vapor-phase polymerization system, comprising:

at least one horizontally disposed cylindrical polymerization reactor having a cylindrical reactor wall and inner diameter containing subfluidized particulate polymer bed wherein at least a portion of the heat of polymerization is removed by evaporative cooling using a readily volatilizable quench liquid;

a drive shaft being coaxially mounted for rotation about its longitudinal axis and predominantly within the cylindrical polymerization reactor;

one or more classes or substantially contiguous paddle stations disposed along the drive shaft within the reactor, each station having one or more station paddles attached to the shaft so as to sweep through a cylindrical zone within the reactor thereby defining station lengths along the shaft; and a plurality of sub-stations in at least one of said paddle station classes, each sub-station having lengths along the shaft of no more than 50 percent of total width of the paddle station, and one or more sub-station paddles attached to said drive shaft at each sub-station so as to sweep through a sub-section of the cylindrical zone within the reactor, said one or more substation paddles being disposed in one or more planes including said axis of said drive shaft.

18. The apparatus for mechanically stirring the polymer particles according to claim 12 wherein a first class of said stations is disposed within the reactor along about $1/5$ to $4/5$ of the drive shaft in repeating groups of at least two of said stations and a second class of said stations is disposed within the reactor along about $4/5$ to $1/5$ of the drive shaft in repeating groups of at least more than the number of said stations in the repeating group of the first class.

19. The apparatus for mechanically stirring the polymer particles according to claim 18 wherein each of the first class of paddle stations has from two to about four essentially flat paddles each having a center line located along a radius perpendicular to the longitudinal axis of the drive shaft with a distal end positioned in close proximity to an inner surface of the cylindrical reactor wall.

20. The apparatus for mechanically stirring the polymer particles according to claim 19 wherein the first class of stations have essentially flat paddles at angular intervals of one hundred twenty degrees around the drive shaft and paddles on adjacent stations of the first class have an angular orientation of sixty degrees.

* * * * *